United States Patent [19]

Nakashima et al.

[11] Patent Number: 5,206,760

[45] Date of Patent: Apr. 27, 1993

[54] MULTIPROJECTION APPARATUS

[75] Inventors: Akio Nakashima, Yokohama; Junichi Ikoma, Yoksuka; Yasutoshi Nakashima, Toyokawa; Sadayuki Nishimura, Minokamo; Yoshihisa Hosoe, Kakamigahara; Tatsumi Hasebe, Kamo; Akira Okamoto, Minokamo, all of Japan

[73] Assignees: Hitachi, Ltd., Tokyo; Hitachi Video & Information System, Inc., Kanagawa, both of Japan

[21] Appl. No.: 857,253

[22] Filed: Mar. 25, 1992

[30] Foreign Application Priority Data

Oct. 1, 1990 [JP] Japan ................................ 3-260573
Apr. 19, 1991 [JP] Japan ................................ 3-113889

[51] Int. Cl.$^5$ ............................................ G03B 21/56
[52] U.S. Cl. ................................... 359/457; 359/443
[58] Field of Search ............... 359/443, 450, 457, 460, 359/591, 592, 449

[56] References Cited

U.S. PATENT DOCUMENTS

| | | | |
|---|---|---|---|
| 4,668,046 | 5/1987 | Yatabe et al. | 359/443 |
| 4,695,135 | 9/1987 | Den Exter Blokland et al. | 350/452 |
| 4,895,429 | 1/1990 | Iwahara et al. | 350/124 |
| 5,011,277 | 4/1991 | Ogino et al. | 353/94 |
| 5,103,339 | 4/1992 | Broome | 359/443 |

FOREIGN PATENT DOCUMENTS 63-88976 4/1988 Japan.

Primary Examiner—Richard A. Wintercorn
Attorney, Agent, or Firm—Antonelli, Terry, Stout & Kraus

[57] ABSTRACT

There is provided the construction of a multiprojection apparatus composed of a plurality of projection units arranged in the vertical and horizontal directions, in which a transparent holding strip having an H-shaped cross section is inserted between screens each composed of a lenticular sheet and a Fresnel lens, and the right and left ends of a multiscreen are supported by elastic support members, or in which a receive member for receiving the screen in the direction of the optical axis and a screen holding device are provided, the receive member has such a shape as not to block projection light corresponding to an image on the screen and is located near a joint of the screen and another screen, and the holding device is disposed on a black stripe of the lenticular sheet and always pulled by an elastic member toward the receive member. Therefore, according to the present invention, it is possible to restrict the missing of information due to joints of the screens.

6 Claims, 4 Drawing Sheets

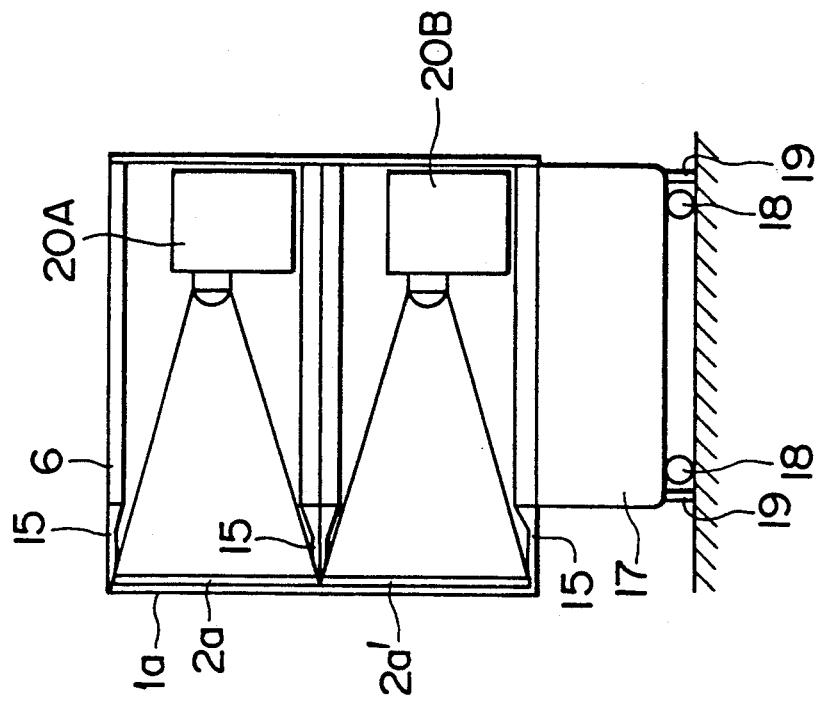
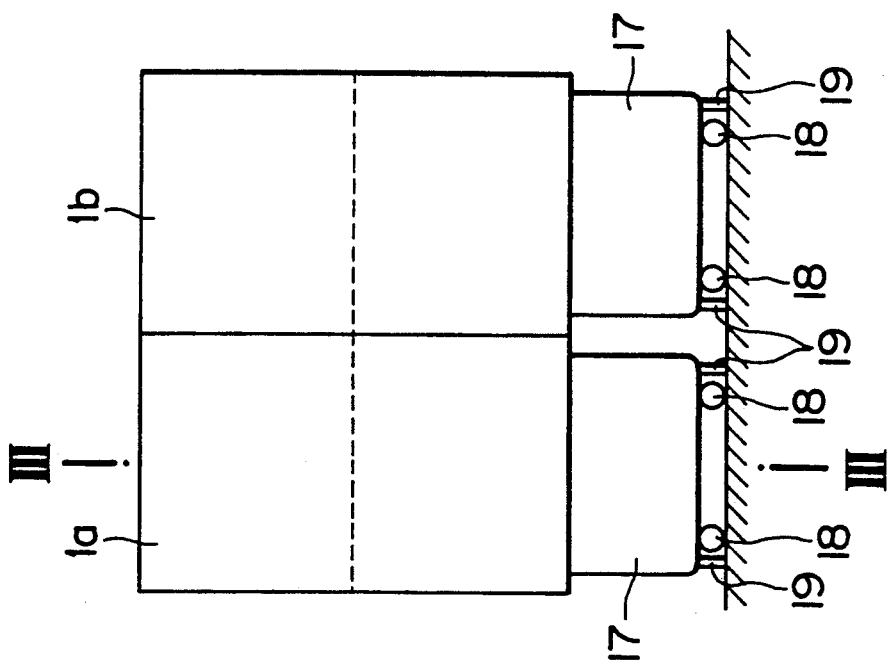

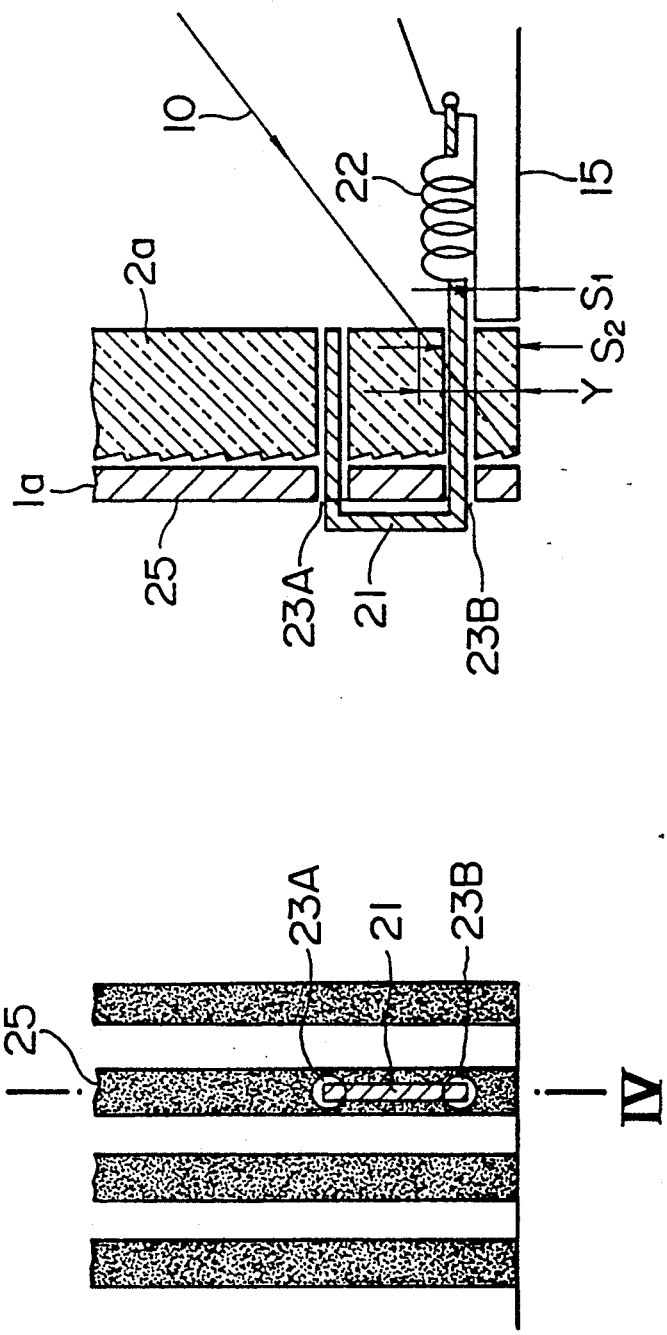

MULTIPROJECTION APPARATUS

BACKGROUND OF THE INVENTION

1. Field of the Invention

The present invention relates to a multiprojection apparatus composed of a plurality of projection units, and more particularly, to a multiprojection apparatus capable of restricting the missing of information due to joints.

2. Description of the Related Art

A well-known type of multiprojection apparatus is disclosed in, for example, the catalog of Pioneer Electronic Corp., "MULTIPROJECTION SYSTEM" (issued in July, 1990) and Japanese Patent Unexamined Publication No. 63-88976.

Such an apparatus is composed of a plurality of projection units 11 shown in FIG. 5.

FIG. 6 is a sectional side view of a conventional multiprojection television.

Referring to FIGS. 5 and 6, the multiprojection television is constituted by rear projectors 20A and 20B each having red, green and blue projection tubes, a lens system for expanding and condensing projection light, an electric circuit for driving the projection tubes, and so on; transmission-type rear screens 26A and 26B each composed of a Fresnel lens and a lenticular sheet; receive members 15 for holding the screens 26A and 26B; screen frames 12 for holding the screens 26A and 26B; and a cabinet 6 for this rear projection television. Projection light emitted from the rear projector 20A is diffused by the transmission-type rear screen 26A and projects an image.

Similarly, projection light emitted from the rear projector 20B is diffused by the transmission-type rear screen 26B and projects an image. If it is assumed that each rear projector is a 42-inch projection television, four projectors are arranged vertically and horizontally so as to form a large screen projection television of 84 inches in size. Reference numerals 17 and 18 denote a stand for the large screen projection television, and casters for moving the projection television.

However, since the screen frames 12 are attached to screens of the projection units 11, respectively, in the above prior art, if a plurality of projection units 11 are combined, joints 12 each having a width of approximately 12 mm are formed as shown in FIG. 5, and information is missed in the joints 12, resulting in difficulty in seeing an image.

SUMMARY OF THE INVENTION

An object of the present invention is to solve the above problem of the prior art, and to provide a multiprojection apparatus capable of restricting the missing of information due to joints when a plurality of projection units are joined.

In order to achieve the above object, there is provided a multiprojection apparatus composed of a plurality of projection units arranged vertically and horizontally in which a holding strip having an at least partially substantially H-shaped cross section and made of a transparent material is inserted between adjoining sets each composed of a lenticular sheet and a Fresnel lens in at least one of vertical and horizontal directions of the multiprojection apparatus so as to hold the adjoining sets of the lenticular sheets and the Fresnel lenses, and in which ends of sets of lenticular sheets and Fresnel lenses at the right and left ends of a multiscreen are supported by support strips having elasticity.

According to the above construction, it is possible to remove wide screen frames, which cause the missing of information, from joints of screens, and to prevent light beams collimated by a Fresnel lens and diffused by a lenticular sheet from being blocked at the joints between the adjoining sets of lenticular sheets and Fresnel lenses since the aforementioned holding strip is transparent, thereby preventing all light beams passing through the Fresnel lenses from being blocked.

Furthermore, since the ends of the sets of lenticular sheets and Fresnel lenses at the right and left ends of the whole multiscreen are supported by the elastic support strips, the sets are always pressed toward the holding strip (inward). Therefore, although it is necessary in the prior art to make the width of the screen frame (corresponding to a width X of a holding strip 3 shown in FIG. 1 according to the present invention) large enough to hold the screen in spite of the expansion and contraction of the screen due to the difference in thermal expansion between the screen and the screen frame, the width X of a holding strip can be reduced according to the above construction of the present invention. In addition, since the holding strip is transparent, the missing of information can be substantially avoided.

Furthermore, in order to achieve the above object, a screen receive member is thinned, formed in such a shape as not to block projection light for forming an image on the screen, and disposed near a joint of screens, a screen holding device is mounted on a black stripe of the lenticular sheet and elastically connected to the screen receive member.

In order to restrict the missing of information due to the joints of the screens, one lenticular sheet is used for n number of Fresnel lenses (n is an integer of not less than two), and a cabinet containing n number of rear projectors, n number of Fresnel lens and one lenticular sheet constitutes a multiprojection TV unit.

Since projection light emitted from a projection tube slantingly enters the end of a screen, it travels to the surface of the Fresnel lens while expanding in the lens. Therefore, a portion where an image does not appear is formed at the end of the incident surface of the projection light in the screen. If the thickness of the screen receive member is made less than that of the portion of the screen where an image does not appear, the shadow caused by the screen receive member does not appear on the screen.

Preferably, the screen support device made of a wire has a thickness less than the width of a black stripe on the screen, and is caught on the black stripe and pulled. The wire thereby has no influence on the image since it serves as a black stripe on the screen surface.

N number of Fresnel lenses (n is an integer of not less than two) and one lenticular sheet having a size equal to the total size of the n number of Fresnel lenses are combined so as to constitute a screen having a size equal to the total size of the n number of Fresnel lenses. As a result, joints are outwardly removed from the screen, and thus the missing of an image due to lenticular sheets is prevented.

N number of rear projectors (n is an integer of not less than two) and n number of Fresnel lenses are vertically combined, and one lenticular sheet having a size equal to the total size of the combination is mounted. One unit composed of a cabinet smaller than the screen projects an image over the whole screen or to the end of the screen. Thus, if m number of such units (m is an integer of not less than two) are arranged horizontally without any interval, the missing of an image due to joints of screens is restricted in a multiprojection apparatus of a n×m structure.

BRIEF DESCRIPTION OF THE DRAWINGS

FIG. 3A is a front view of a four-screen multiprojection apparatus according to another embodiment of the present invention;

FIG. 3B is a cross-sectional view taken from line III—III shown in FIG. 3A;

FIG. 4A is a front view showing the details of a screen attachment portion according to the embodiment shown in FIGS. 3A and 3B;

FIG. 4B is a cross-sectional view taken from line IV—IV shown in FIG. 4a;

DESCRIPTION OF THE PREFERRED EMBODIMENTS

An embodiment of the present invention will now be described with reference to FIGS. 1 and 2.

Figure 1:
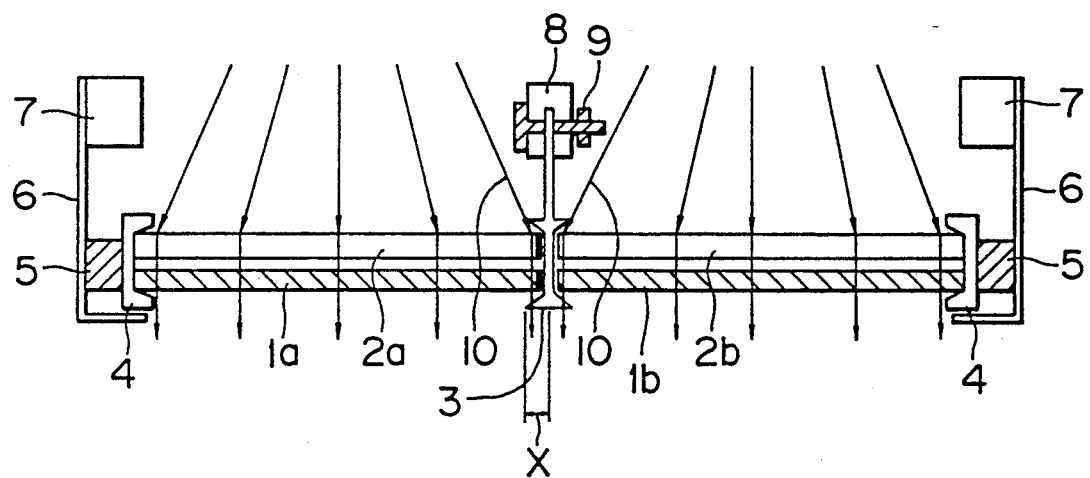
FIG. 1 is a cross-sectional view of the principal part of a four-screen multiprojection apparatus according to an embodiment of the present invention.
Figure 2:
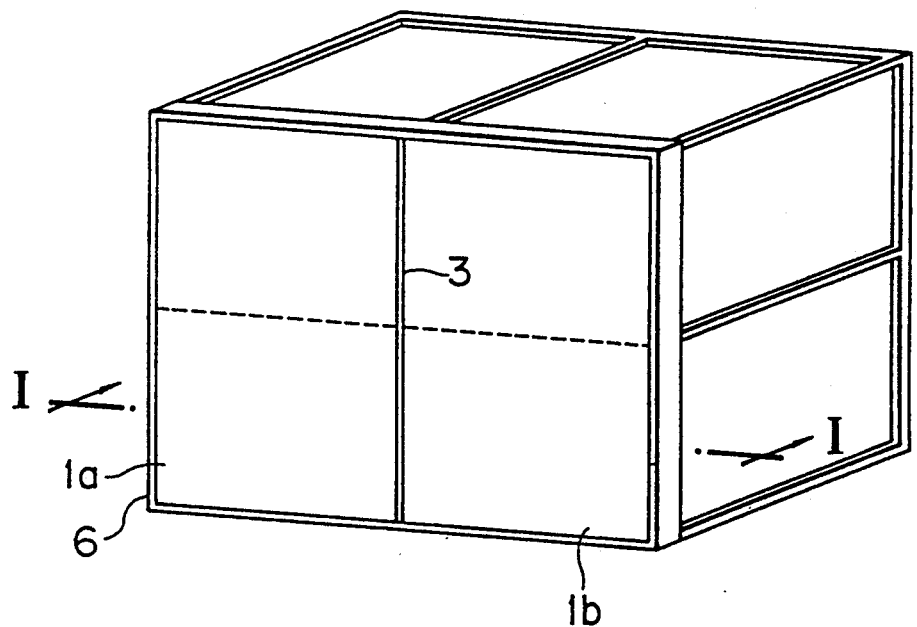
FIG. 2 is an outside perspective view of the four-screen multiprojection apparatus shown in FIG. 1.
Figure 5:
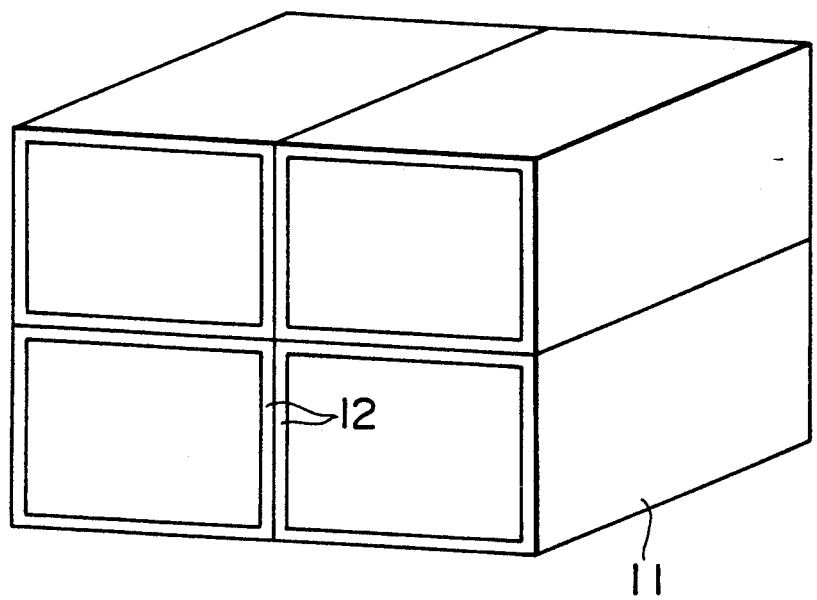
FIG. 5 is a perspective view of a conventional four-screen multiprojection apparatus.
Figure 6:
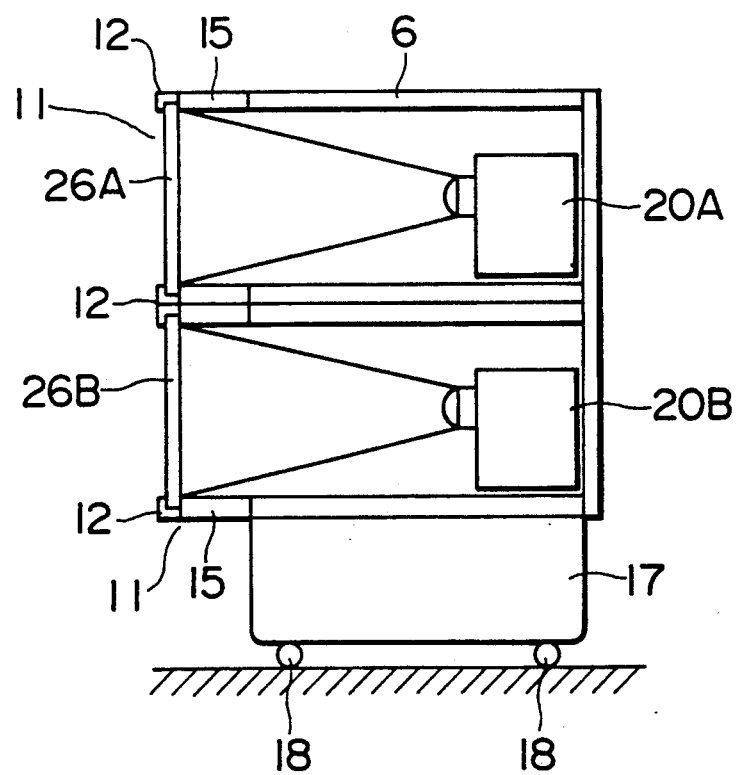
FIG. 6 is a cross-sectional view of a conventional multi-screen rear projection television.

FIG. 1 is a cross-sectional view of the principal part of a four-screen multiprojection apparatus according to an embodiment of the present invention, and FIG. 2 is a perspective view showing the outward appearance of the four-screen multiprojection apparatus shown in FIG. 1. The body (including a drive portion), such as a cathode-ray tube for light emission is omitted. In short, FIG. 1 shows a cross section taken in the I—I direction shown in FIG. 2.

Referring to FIGS. 1 and 2, lenticular sheets 1 (1a and 1b) and Fresnel lenses 2 (2a and 2b) constitute screens of projection units. A holding strip 3 made of a transparent material extends like a rod, and at least a part of its cross section is substantially H-shaped. Support strips 4 each are also formed in the shape of a rod. Reference numerals 5, 6, 7 and 8, 9, and 10 denote elastic support members, a frame, stays, a support screw and light beams, respectively. The lenticular sheets 1a and 1b are integrally formed in the vertically direction, while the Fresnel lenses 2a and 2b are separated for respective projection units.

As shown in FIG. 1, the holding strip 3 is fixed to the stay 8 by the support screw 9. The support strips 4 each are fixed through the elastic support member 5 to the frame 6 which is fixed to the stays 7.

The holding strip 3 is located between a set of the lenticular sheet 1a and the Fresnel lens 2a and a set of the lenticular sheet 1b and the Fresnel lens 2b to hold both the sets.

The support strips 4 are disposed at the left end of the set of the lenticular sheet 1a and the Fresnel lens 2a and at the right end of the set of the lenticular sheet 1b and the Fresnel lens 2b, respectively, and urged toward the holding strip 3 by elastic forces of the elastic support members 5, thereby supporting both the sets of the lenticular sheets and the Fresnel lenses therebetween.

Thus, the lenticular sheets 1 and the Fresnel lenses 2 for constituting the screens of the projection units are supported separately from the body (including a drive portion), such as the cathode-ray tube for light emission.

As a result, the light beam 10 passing through the right end of the Fresnel lens 2a or the left end of the Fresnel lens 2b is not blocked since the holding strip 3 is transparent, and thus the missing of information due to joints of screens can be restricted. Since the sets of the lenticular sheets and the Fresnel lenses are always pressed toward the holding strip 3 by the elastic support members 5, it is possible to thin the holding strip 3 and thus to make the joints substantially inconspicuous. Furthermore, a shading plate or the like is stuck to parts of the holding strip 3 connected to the stay 8 (parts other than the substantially H-shaped parts) in order to prevent the light beams from leaking out to other projection units.

As described above, the lenticular sheets 1 are integrally formed in the vertical direction, and only the Fresnel lenses 2 are separated for respective projection units. In addition, another holding strip (not shown) may be disposed between the Fresnel lenses so as to make the holding strip inconspicuous in front.

It is only necessary that the holding strip 3 be made of a transparent material and at least a part of its cross section is substantially H-shaped. The shape of the whole holding strip 3 is not accurately specified. The support strips 4 and the elastic support member 5 may be integrally formed. Although the cathode-ray tube is used as a light emitting device and the number of screens is 4 in the above embodiment, they are not limited to the above embodiment.

Another embodiment of the present invention will now be described with reference to FIGS. 3A, 3B, 4A and 4B. The same components as those in FIGS. 1 and 2 are denoted by like numerals and the description of the components is omitted.

Referring to the figures, reference numerals 6, 17, 18 and 19 denote a cabinet with a screen support portion, stands for a multiprojection apparatus, casters for movement, transportation and so on, and legs which fix the stands 17 and has a variable length. In each of rear projectors 20A and 20B, three projection tubes of red, green and blue disposed in the inner part in the figures, a lens system for expanding and condensing projection light, an electric circuit for driving the projection tubes and so on are mounted. Light beams emitted from the projection tube reach Fresnel lenses 2a and 2a'. The incident light beams from the back of the Fresnel lenses 2a and 2a' are refracted at Fresnel portions on the surfaces of the lenses 2a and 2a', and diffused by a lenticular sheet 1a, thereby projecting an image.

In FIG. 4B, reference numeral 15 denotes a screen receive member, and numeral 21 denotes a wire for holding the Fresnel lens 2a and the lenticular sheet 1a on the screen receive member 15. The wire 21 is passed through two holes 23A and 23B, which are formed through a black stripe 25 of the lenticular sheet 1a and the Fresnel lens 2a, in the shape of U, and connected to a spring 22 from the hole 23B at the end of the screen. A light beam 10 emitted from the projection tube forms an image at the end of the screen. If it is assumed that a distance between a position where the light beam 10 enters the Fresnel lens 2a and the end of the Fresnel lens 2a is Y, a thickness S1 of the screen receive member 15 and a distance S2 between the upper end of the screen hole 23B and the end of the Fresnel lens 2a are both less than Y.

Referring to FIG. 4A the holes 23A and 23B and the wire 21 each have a width less than that of the black stripe 25, and located on the black stripe 25.

Light beams emitted from the rear projector 20A reach the end of the Fresnel lens 2a without being blocked by the screen receive member 15 and the wire 21, and project an image on the lenticular sheet 1a. Similarly, light beams emitted from the other projector 20B reach the end of the Fresnel lens 2a' and project an image on the lenticular sheet 1a. An image on a lenticular sheet 1b is projected by the rear projectors in the same manner as above. Thus, by arranging the screens without any interval, a large image or four separate images can be projected with little missing of information.

Since the present invention has the above construction, it has the following advantages.

(a) As shown in FIGS. 1, 4A and 4B, since the screen can be supported without any influence on an image, the image can be projected on the whole screen or on the end of the screen, and thus the missing of information due to joints of the frames of the projection units can be substantially restricted.

(b) since one lenticular sheet is used for n number of projectors (n is an integer of not less than two) and n number of Fresnel lenses, n−1 number of joints of screens are not conspicuous. Furthermore, the use of a stand with casters which is vertically movable improves movability.

What is claimed is:

1. A multiprojection apparatus for arranging a plurality of screens each composed of a lenticular sheet and a Fresnel lens on the front of a plurality of combined projection units in order to form a large screen, wherein a holding strip having an at least partially substantially H-shaped cross section and made of a transparent material is inserted between adjoining screens of said screens and support strips having elasticity are disposed at the ends of screens of said screens corresponding to the right and left ends of said large screen to support the ends of said screens.

2. A multiprojection apparatus for arranging a plurality of screens each composed of a lenticular sheet and a Fresnel lens on the front of a plurality of combined projection units in order to form a large screen, wherein a receive member for receiving each of said screens in the direction of the optical axis and having such a shape as not to block projection light corresponding to an image on said screen is located near a joint of said screen and another screen, and a screen holding device for holding said screen is disposed on a black stripe of said lenticular sheet and connected to said receive member through an elastic member for always pulling said screen holding device toward said screen receive member.

3. A multiprojection apparatus according to claim 1, wherein said screen is formed by using n number of Fresnel lenses (n is an integer of not less than two) and one lenticular sheet.

4. A multiprojection apparatus according to claim 2, wherein said screen is formed by using n number of Fresnel lenses (n is an integer of not less than two) and one lenticular sheet.

5. A multiprojection apparatus according to claim 1, wherein said multiprojection apparatus is provided with a nxm structure by arranging m number (m is an integer of not less than two) of units horizontally, said unit being formed by vertically arranging a vertically movable stand with casters for movement and transportation and n number (n is an integer of not less than two) of three-tube rear projectors for projecting an image on a transmission-type screen.

6. A multiprojection apparatus according to claim 2, wherein said multiprojection apparatus is provided with a nxm structure by arranging m number (m is an integer of not less than two) of units horizontally, said unit being formed by vertically arranging a vertically movable stand with casters for movement and transportation and n number (n is an integer of not less than two) of three-tube rear projectors for projecting an image on a transmission-type screen.

* * * * *

UNITED STATES PATENT AND TRADEMARK OFFICE
CERTIFICATE OF CORRECTION

PATENT NO. : 5,206,760
DATED : April 27, 1993
INVENTOR(S) : Nakashima, et. al.

It is certified that error appears in the above-indentified patent and that said Letters Patent is hereby corrected as shown below:

On the Title page, item [30], delete "Oct. 1, 1990 [JP] Japan ......3-260573".

Signed and Sealed this

Fifteenth Day of March, 1994

Attest:

BRUCE LEHMAN

Attesting Officer    Commissioner of Patents and Trademarks